United States Patent

[11] 3,622,753

| [72] | Inventors | Ruth F. Lax |
| | | 164 E. 81st St., New York, N.Y. 10028; |
| | | Frank Kahn, Abington, Pa. |
| [21] | Appl. No. | 63,793 |
| [22] | Filed | Aug. 14, 1970 |
| [45] | Patented | Nov. 23, 1971 |
| [73] | Assignee | said Lax, by said Kahn |

[54] PORTABLE HEAT-MAINTAINING AND WARMING FOOD TRAY
11 Claims, 5 Drawing Figs.

[52] U.S. Cl............................................... 219/452,
219/268, 219/448, 219/464, 219/488, 219/519,
320/2, 99/422
[51] Int. Cl............................................... H05b 3/68
[50] Field of Search........................................ 219/448–449,
268, 464, 482, 488, 519, 451–453;
320/36, 2

[56] References Cited
UNITED STATES PATENTS

| 2,550,579 | 4/1951 | McDowell.................. | 219/452 |
| 2,570,975 | 10/1951 | Osterheld.................. | 219/462 X |
| 3,043,943 | 7/1962 | Moot.......................... | 219/449 |
| 3,105,138 | 9/1963 | Gazdik....................... | 219/386 |
| 3,290,484 | 12/1966 | Day............................ | 320/2 X |
| 3,317,709 | 5/1967 | Beasley...................... | 219/449 |
| 3,423,572 | 1/1969 | Pansing...................... | 219/451 X |
| 3,496,336 | 2/1970 | Hingorany et al............ | 219/464 |
| 3,513,290 | 5/1970 | Burley et al................. | 320/2 X |

*Primary Examiner*—Volodymyr Y. Mayewsky
*Attorney*—Caesar, Rivise, Bernstein & Cohen

ABSTRACT: A heat-maintaining and warming food tray is provided having a self-contained power source. The device includes a heatable plate to the underside of which a plurality of strips of heating tape are secured. The power source comprises rechargeable batteries which are connected to the heating tape via switching means. The switching means disconnect the strips from the power source when the output voltage of the battery falls below a predetermined voltage.

INVENTORS
RUTH F. LAX
FRANK KAHN
BY
Caesar, Rivise,
Bernstein + Cohen
ATTORNEYS

PORTABLE HEAT-MAINTAINING AND WARMING FOOD TRAY

This invention relates generally to warming devices and more particularly to a heat-maintaining and warming food tray having a self-contained power source.

Heat-maintaining and warming trays have provided a very important tool for entertainment purposes since they enable food which tastes better in a heated state to be kept warm while displayed to guests at a social event. These trays are conventionally cord connected to an electric power source and are heated to a temperature in the neighborhood of 200° to 210° F. and maintain the food provided on the top heating surface thereof at a suitable temperature for preserving the flavor thereof.

There are, however, many occasions where the heat-maintaining and warming tray would be suitable but an external power source is not accessible. For example, at a lawn party, where it is desired that the food be served several hundred feet from the closest power source, it is impractical to use the tray because of the necessity for unseemly long lengths of wire cables along the area where persons are being entertained.

It is, therefore, an object of this invention to overcome the aforementioned limitations of conventional heat-maintaining and warming trays.

Another object of the invention is to provide a new and improved heat-maintaining and warming tray which includes a self-contained power source for heating food.

Yet another object of the invention is to provide a new and improved warming device having a self-contained power source which is efficient and therefore enables heating of foods for suitable periods of time at temperatures in excess of 200° F.

Still another object of the invention is to provide a new and improved warming device having a self-contained power source which includes switching means to enable electrical disconnection from the power source to the heating elements of the warming device so that the power supply cannot be ruined by falling below a predetermined voltage.

These and other objects of the invention are achieved by providing a warming device having a self-contained power source. The device includes a heatable plate which has secured thereto at least one strip of heating tape. The power source comprises rechargeable batteries. The switching means are connected to the power source to enable connection thereof to the heating strip. The power source heats the plate. The switching means includes means for disconnecting the strip from the power source when the output voltage of the batteries falls below a predetermined voltage.

Other objects and many of the attendant advantages of this invention will be readily appreciated as the same becomes better understood by reference to the following detailed description when considered in connection with the accompanying drawings wherein.

Referring now in greater detail to the various figures of the drawing wherein like reference numerals refer to like parts, a heat-maintaining and warming food tray embodying the invention is shown generally at 20 in FIG. 1.

The tray 20 basically comprises a rectangular housing 22 which houses the portable power supply and electrical circuitry utilized for warming a rectangular heating plate 24. The heating plate 24 is surrounded by a peripheral frame 26. The heating plate 24 is planar and preferably comprised of aluminum alloy 5052 (as per ANSI standard H35.1—1967).

The frame 26 is preferably comprised of wood. The lower portion of the housing which supports the frame 26 and the heating plate 24 is preferably comprised of stainless steel.

Figure 4:
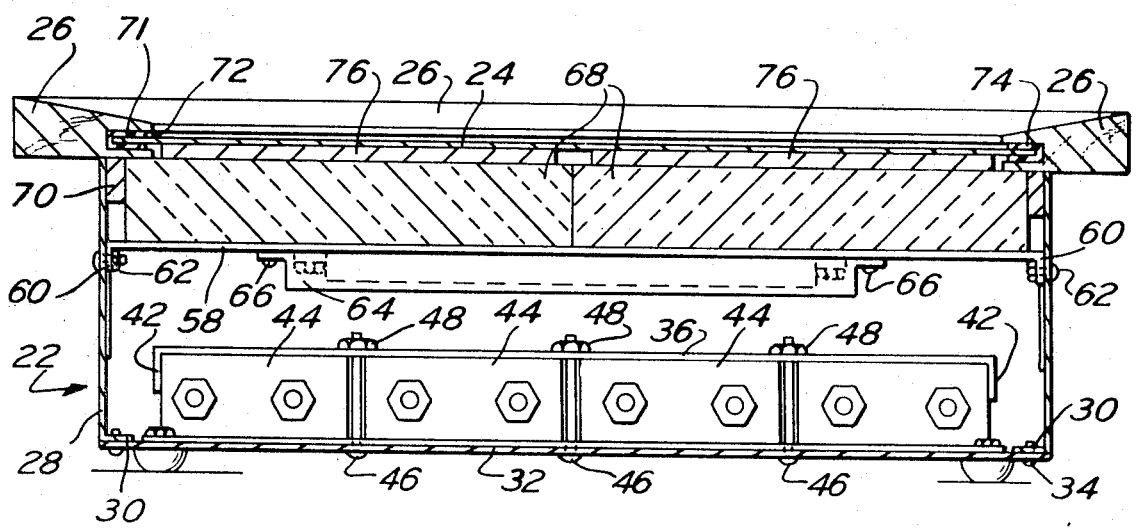
FIG. 4 is an enlarged sectional view taken along the line 4—4 in FIG. 1.

As best seen in FIG. 4, the housing 22 basically comprises a sidewall 28 which extends about the entire housing and which is disposed vertically. The sidewall 28 includes a horizontally and inwardly extending flange 30 which also extends about the periphery of the housing 22.

A bottom plate 32 which is rectangular and planar is secured to the flange 30 by a plurality of suitable threaded fasteners 34 which extend through openings provided therefor in plate 32.

Also secured to the bottom plate 32 are a plurality of brackets 36, 38 and 40. Brackets 36 and 38 are longer than bracket 40 and extend substantially the width of the bottom plate 32. Bracket 40 is shorter than brackets 36 and 38 and extends approximately half the width of the plate 32. Each of the brackets 36, 38 and 40 includes a pair of vertically depending end flanges 42, as best seen in FIG. 4. Both of the brackets 36 and 38 are utilized to secure four rechargeable batteries 44 to the bottom plate 32. Bracket 40 is utilized to secure a pair of rechargeable batteries 44 to the bottom plate 32.

The brackets are secured to the bottom plate 32 by suitable threaded fasteners 46 which extend through the bottom plate 32 up to and through openings provided therefor in brackets 36, 38 and 40. A nut 48 is secured to the uppermost end of the threaded fastener to maintain the bracket against the batteries 44. Brackets 36 and 38 require three fasteners which extend between each adjacent pair of batteries 44. Bracket 40 requires only a single fastener between the pair of batteries 44.

Figure 3:
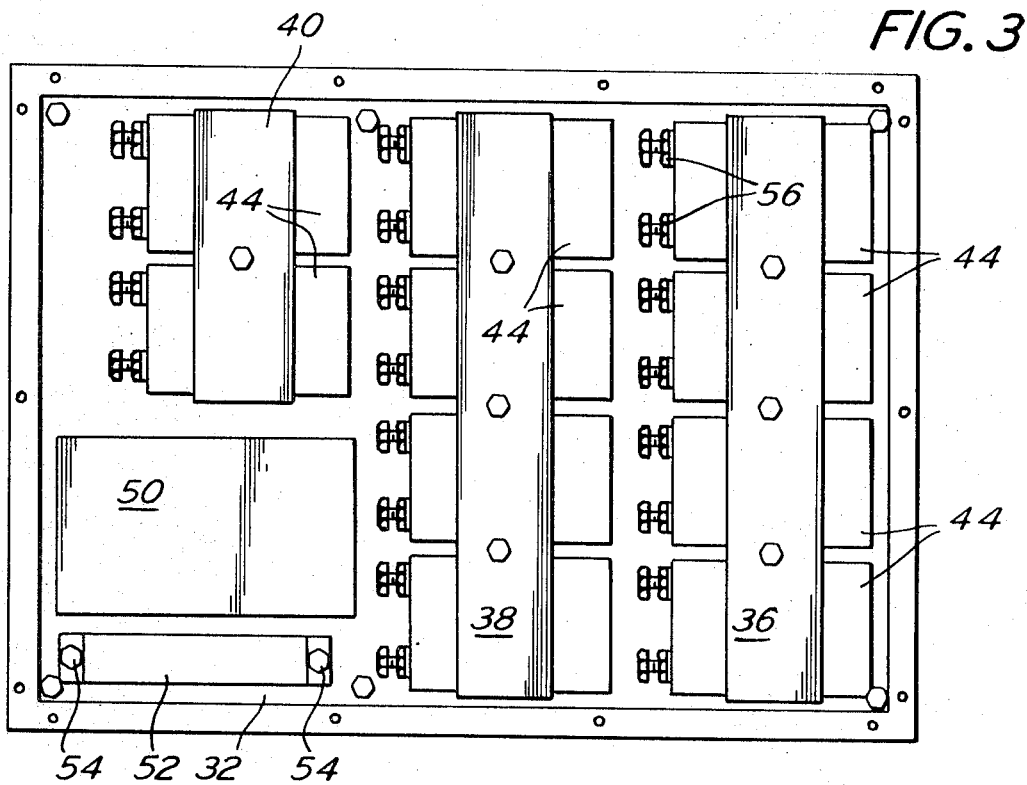
FIG. 3 is a top plan view of the contents of the bottom portion of the tray with the top section removed.
Figure 5:
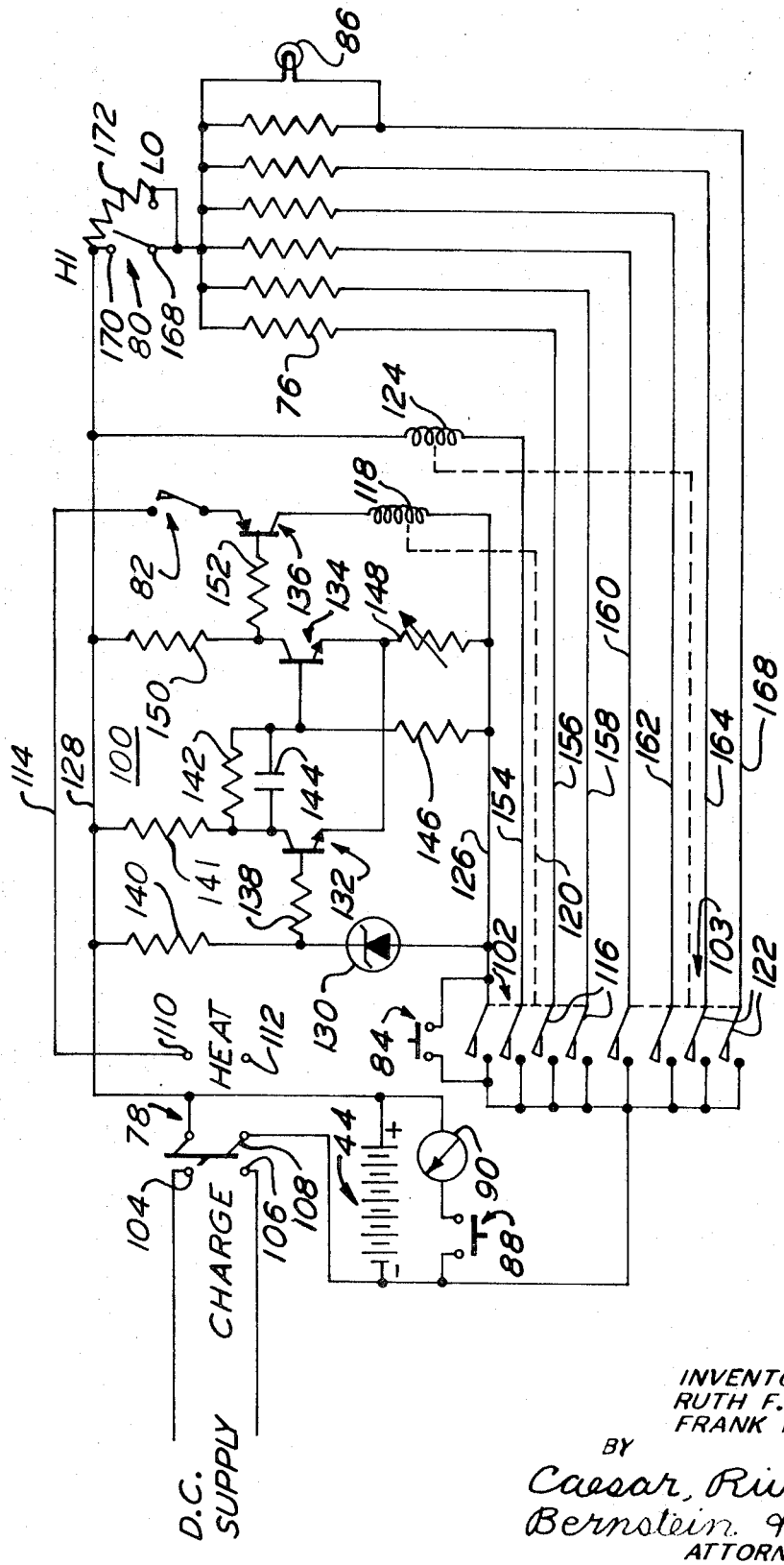
FIG. 5 is a schematic diagram of the electrical circuitry which is utilized in the tray.

Referring to FIG. 3, it can be seen that adjacent the bracket 40, an electrical circuit is secured to the bottom plate 32 and is mounted in a circuit board 50. The electrical circuitboard 50 is suitably secured to the bottom plate 32 by threaded fasteners (not seen). Adjacent the board 50 is a terminal block 52 which is suitably secured to the bottom plate 32 by a pair of threaded fasteners 54. It should be understood that the electrical wiring required between the batteries and the electrical circuitry is not shown in any of the structural drawings for purposes of clarity. The connections between the various components of the device are shown in FIG. 5 which is described hereinafter.

The terminal block 52 aids in the routing of the wires within the confines of the housing 22. Similarly, each of the batteries 44 includes terminals 56 which are comprised of threaded fasteners to facilitate the securing of wires between the batteries and to the several components of the electrical circuitry.

It should be noted that the 10 batteries are serially connected together to increase the output voltage by 10 times the value of an individual battery' output voltage.

As best seen in FIG. 4, a supporting bridge or partition 58 is provided which is disposed horizontally and extends transversely between opposing longitudinally extending sidewalls 28 providing an upper and lower compartment. The bridge 58 is basically comprised of an elongated metal strip having a pair of vertically depending flanges 60 which fit flush against the inner surfaces of the sidewall 28. The flanges are secured to the sidewall 28 by a pair of suitable fasteners 62.

As best seen in FIG. 4, a terminal block 64 is secured to the lowermost surface of the bridge 58. The terminal block 64 is secured to the bridge 58 by a pair of suitable fasteners 66.

The bridge 58 supports a pair of high-quality thermal insulation blocks 68 which are preferably comprised of "Thurane," a rigid unicellular polyurethane foam manufactured by the Dow Chemical Company.

Secured to the inner surface of the wall 28 adjacent the top surface thereof and extending completely about the insulation block 68 is a wood strip 70. The wood strip 70 is preferably secured to the inner surface of the wall 28 by an adhesive preferably of the contact cement type. The top surface of the wood strip and the wall 28 provide a platform for the frame 26 which extends about the heating plate 24.

As best seen in FIG. 4, the frame 26 includes a horizontally extending slot 72 which receives the periphery of the plate 24. Between the wood frame 26 and the plate 24 is insulating tape which is provided about the periphery of the plate 24 to prevent scorching of the wood 26. The insulating tape is preferably of the glass type such as "Scotch" No. 27 insulating glass tape made by Minnesota Mining and Manufacturing Company.

Secured to the bottom of the heating plate 24 are a plurality of resistive heating strips 76. Twenty-eight of the heating strips 76, 6 inches long and 1 inch wide, are provided and are preferably of the type made by the Briscoe Manufacturing Company and identified as "Briskeat" standard insulated heating tapes. The resistive heating strips 76 are preferably secured to the bottom of the surface 24 by "Weldwood" contact cement which is made by the U. S. Plywood Company.

The frame and heating plate assembly are secured to the housing 22 preferably by contact cement between the frame 26 and the wood strip 70 which is secured to the sidewall 28.

Figure 1:
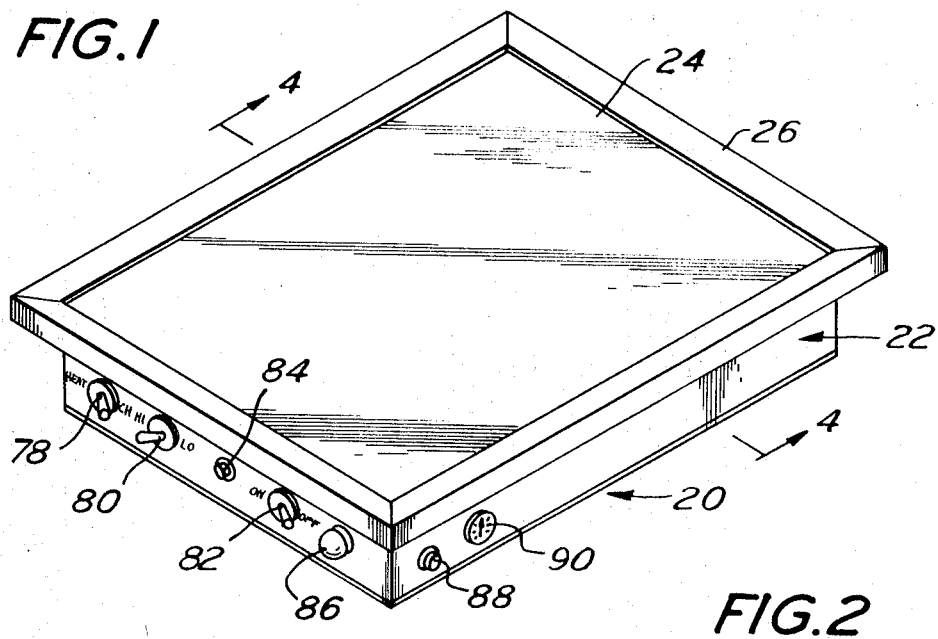
FIG. 1 is a perspective view of a heat-maintaining and warming food tray embodying the invention.
Figure 2:
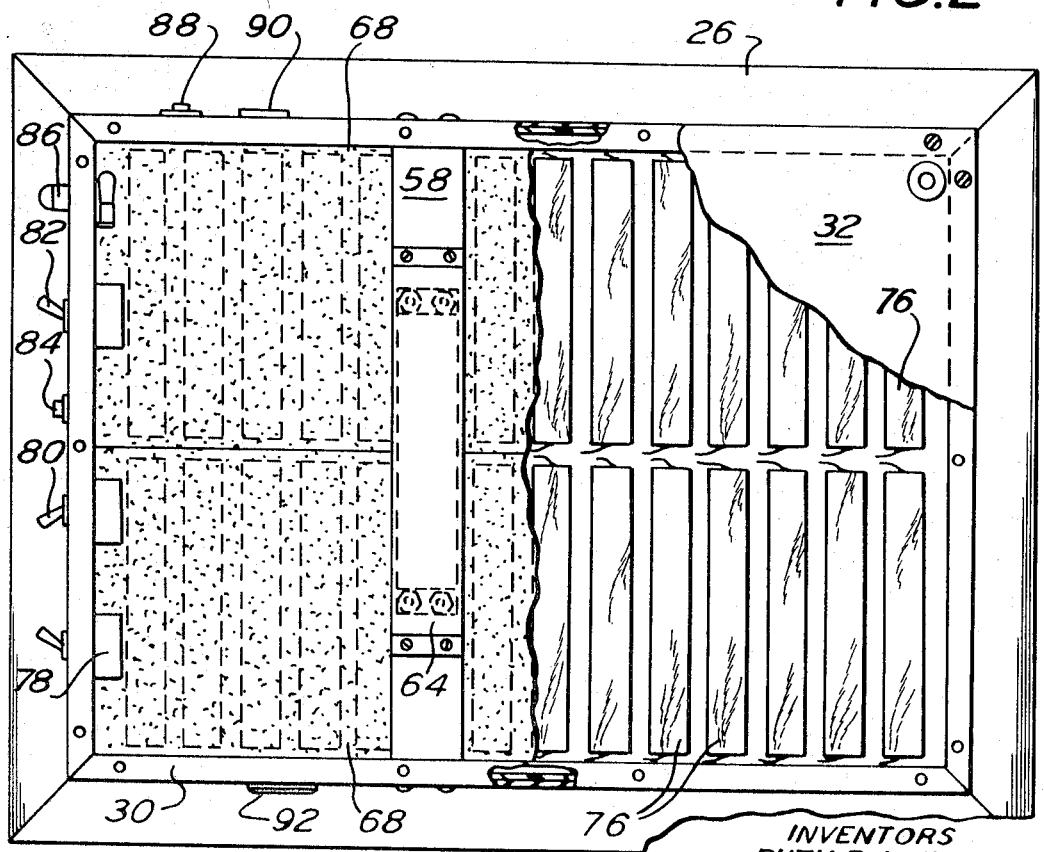
FIG. 2 is an enlarged bottom plan view of the tray with portions removed to enable clarity.

As best seen in FIGS. 1 and 2, a plurality of control switches are provided at one end of the housing 22. A first switch 78 is provided which enables selection between a heating mode of operation and a charging mode of operation. A second switch 80 is provided which enables selection between a high rate or low rate of transmission of current from the power supply to the heating element and a third two-way switch 82 is provided which enables selection between an on or off mode. Provided between switches 80 and 82 is a pushbutton 84 which is utilized to initiate a heating cycle. Mounted to the right of switch 82 is a lamp 86 which is energized when plate 24 is being heated. Mounted further to the right of lamp 86 in an adjacent sidewall is a pushbutton 88 and a voltmeter 90. The voltmeter 90 is used to indicate the voltage at the output of the rechargeable battery so that it can be determined whether or not charging of the batteries is necessary. The voltmeter is operable only during the time that the pushbutton 88 is pressed.

As best seen in FIG. 2, a female jack 92 is provided on the other side of the sidewall 28 for connection of a direct current charging source to the rechargeable battery for energizing the batteries to a suitable voltage level. The tray batteries are conveniently charged by a plug-in cord connection (not shown) from the charging circuit plugged into the jack 92. The source of DC current may be, in addition to a direct current voltage source, an AC current source which is connected via an AC to DC converter.

The electrical circuitry is best seen in FIG. 5. The circuit includes, in addition to switches 78, 80 and 82, lamp 86, pushbuttons 84 and 88, voltmeter 90, and the resistive strips 76, a safety switching circuit 100 and a pair of relays 102 and 103.

As set forth hereinabove, the batteries 44 are connected serially so that the combined voltage of each of the batteries is effectively added together. Each of the batteries is preferably a nickel-cadmium battery having a nominal charged voltage of 1.25 volts with a nominal capacity of 15 ampere hours. The nickel-cadmium rechargeable batteries 44 are preferably "Eveready" No. RH15 nickel-cadmium cells marketed by Union Carbide Corporation. When each battery is completely charged up, the no-load terminal voltage is increased to approximately 1.45 volts. The batteries, however, should not be depleted below an output voltage of 1.1 volts in order to prevent disruption by internal pressure. Accordingly, it can be seen that since 10 of these nickel-cadmium batteries are utilized, the output voltage is 12.5 volts for the batteries connected serially.

The pushbutton 88 and voltmeter 90 are connected serially across the positive and negative terminals of the combined battery. Each time the pushbutton 88 is pressed, voltmeter 90 provides an indicating of the voltage across the batteries. Where the no-load voltage is over 14 volts, it can be determined that the batteries are in a completely charged condition. Where the no-load voltage is less than 14 volts, it is preferable to connect the charging source across the batteries 44 so that maximum current is available to the circuit to enable the heating of the heating plate 24.

As seen in FIG. 5, switch 78 is a double-pole, double-throw switch which includes a first pair of terminals 104 and 106 which are connected to an external DC supply. When the movable switch arm 108 is in the charging position, terminals 104 and 106 are connected across the batteries 44 thereby charging the batteries 44. Switch 78 also includes terminals 110 and 112. When the arm 108 of the switch 78 is in the heat position, the positive terminal of the batteries 44 is connected to the terminal 110 of switch 78. Terminal 110 is connected via line 114 to the on-off switch 82.

Relay 102 comprises a plurality of contact elements 116 and a relay coil 118. The contact elements 116 are all normally open unless coil 118 is energized. The magnetic interrelationship of the relay coil 118 and the contacts 116 is indicated by dotted line 120 which extends between the relay coil and the switches. Relay 103 includes a plurality of contacts 122 and a relay coil 124. The contacts 122 of relay 103 are also normally open and are closed only when relay coil 124 is energized.

The negative terminal of the batteries 44 is connected to the pushbutton 84 which is connected in parallel with one of the contacts 116 of relay 102. Pushbutton 84 is connected at its other end to a conductor 126. The positive terminal of batteries 44 is connected, in addition to the arm of switch 78, to conductor 128. The switching means 100 is connected between conductors 126 and 128 and includes a Zener diode 130, an NPN-transistor 132, an NPN-transistor 134 and a PNP-transistor 136. Zener diode 130 is connected at a first end to conductor 126 and at its other end to the base of transistor 132 via a resistor 138. The Zener diode 130 is also connected to the conductor 128 via resistor 140. The collector of transistor 132 is connected to conductor 128 via a resistor 141 and is also connected to the base of transistor 134 via an RC circuit comprised of resistor 142 and capacitor 144. The base of transistor 134 is also connected to conductor 126 via resistor 146. The emitter of transistor 132 is connected to the emitter of transistor 134 and to conductor 126 via a variable resistor 148. The collector of transistor 134 is connected to the conductor 128 via a resistor 150 and to the base of transistor 136 via resistor 152. The emitter of transistor 136 is connected to switch 82. The collector of transistor 136 is connected to a first side of relay coil 118 which is in turn connected at its other end to conductor 126. The relay coil 124 is connected between conductor 128 and conductor 154 which is in turn connected to a second contact 116 of relay 102.

One end of each of the contacts 116 and 122 is connected to the negative terminal of the batteries 44. The remaining contacts 116 and 122 are connected via conductor lines 156, 158, 160, 162, 164 and 166 to the resistive strips 76. It should be understood that each of the resistive strips shown in FIG. 5 represents a plurality of the strips connected in parallel. For example, each of the resistors 76 shown in FIG. 5 represents either five or four of the resistive strips in parallel since 28 of the strips are provided on the bottom surface of the heating plate. Lamp 86 is connected across one of the resistive strips so that as long as current is being provided through the resistive strips, lamp 86 is energized to indicate that a heating cycle is taking place. Each of the strips 76 is connected at its other end to a first terminal 168 of the switch 80. Switch 80 also includes a terminal 170 which enables the switch to be connected directly to the conductor 128 when the switch 80 is in the high position.

It should be noted that a resistor 172 is connected across terminals 170 and 168. Thus, when the switch 80 is in the low position, the switch is effectively open thereby causing the resistor 172 to be in serial between terminals 168 and 170 and thereby impedes the current flow through conductor 128 through the resistive strips 76.

The resistor 172 is preferably a solid metallic conductor of manganin or other high-resistivity metal having a low-temperature coefficient of resistivity and is encased in a woven glass sleeve. The sleeve of the resistor 172 is cemented to the underside of the heating plate 124 with contact cement and the resistor extends almost completely around the periphery of the plate 24 outwardly of the heating strips 76. Thus, when switch 80 is in the low position, the heat dissipated in the resistor 172 contributes effectively to heating of the plate 24.

In operation, when the switch 78 is in the charge position, the DC supply is connected directly across the batteries 44 and thereby charges the batteries. After the batteries 44 are completely charged, the switch 78 may then be placed in the heating position. In order to check the voltage across the battery 44, it is necessary only to press the button 88 which thereby causes an indication to be provided on voltmeter 90 of the voltage across the output of batteries 44. The battery voltage check should be made with switch 78 in the heating position prior to operation of a heating cycle and with switch 82 in the off position.

When it is desired that the tray be utilized to heat food on the top surface thereof, the switch 78 is checked to make sure that the switch is in the heat position, the on-off switch 82 is closed to put it in the on position and the pushbutton 84 is momentarily pushed closed.

After the pushbutton 84 is closed, transistor 132 is nonconductive which causes the voltage at the collector thereof to go high. The high voltage is fed to the base of transistor 134 which causes a forward biasing of the emitter-base junction thereof which causes conduction of transistor 134. The conduction of transistor 134 causes the collector thereof to go low in voltage and thereby enable transistor 136 to also be conductive and thereby provide a conductive path through the emitter collector junction thereof which enables the energization of relay 118.

The energization of relay coil 118 causes the contacts 116 to be closed. As soon as the relay contacts 116 are closed, the relay coil 124 is energized by a closed circuit between the conductor 154 and conductor 128 across the batteries 44. Thus, contacts 122 are closed as a result of the energization of relay coil 124. As soon as the contacts 116 and 122 are closed, the circuit is closed across all the resistive strips 76 thereby providing heating current from the batteries 44 to the resistive strips which starts to warm the heating plate. Lamp 86 is also energized as a result of the closing of the switches 122. In order to reach the desired warming temperature in the heating plate as soon as is possible, it is preferable to place the switch 80 initially in the high position so that the current to the heating strips is not impeded. As soon as the temperature which is ultimately desired at the heating plate is reached, the switch 80 should then be moved into the low position which will maintain the temperature and also limit the flow of current to enable a maximum period of time of heat at the heating plate.

The current from batteries 44 can be continued as long as the batteries do not fall below an output voltage of 11 volts. The component values of the circuitry are so chosen that when the output voltage of the batteries reaches 11 volts, the emitter-base junction of transistor 132 is forward biased and thereby causes conduction of the transistor. The conduction of transistor 132 in turn causes a cutting off of transistor 134 and the cutting off of transistor 136. When transistor 136 is cut off, the flow of current through the relay coil 118 is also cut off thereby causing coil 118 to be deenergized and the contacts 116 to be opened as a result thereof. The opening of contacts 116 causes the disconnection of the batteries 44 from the heating strips 76. The opening of the contact 116 connected to conductor 154 also causes the deenergization of relay coil 124 which causes the opening of contacts 122. Thus, all of the connections to the resistive strips 76 are terminated by the deenergization of the relay coils 118 and 124. Since the current dealt with in the invention is in the order of 20 amperes, heavy wiring (at least 12 AWG) is used throughout the heating circuit.

It is also within the purview of this invention to provide the batteries 44 as a plug-in flat unit package which may be slid into the lower compartment through a suitable lateral slot in the lower part of sidewall 28 of the casing (not shown), the unit package making electric contact with the internal electric circuit of the tray by a pair of well-known blade and blade receptacle means (not shown) such as are used in conventional plug-in watt hour meters. By the use of a suitable plurality of these plug-in batteries, previously charged to full voltage, the tray may be kept continuously hot for as long as desired.

It can, therefore, be seen that a new and improved heat-maintaining and warming food tray has been provided. The tray is operated by a self-contained power supply which can be charged when the tray is not in use. It should be noted that the construction of the tray enables an efficient connection of the heating elements to the power supply so that a maximum percentage of the heating energy is provided directly to the heating plate. The heating plate is thermally insulated from the remainder of the system so that the maximum amount of heat is then transferred from the heating plate to the food without unnecessarily heating the frame, housing or components in the lower compartment. The framing element acts not only as an ornamental device but also assists in insulating the heating plate from the remainder of the housing. The insulation blocks provided below the heating plates further remove the heating plate thermally from the remainder of the housing.

A prototype heat-maintaining and warming food tray, constructed as specified in the foregoing having a heating plate surface of approximately 15 × 20 inches, starting with the batteries fully charged, maintained a heating surface temperature substantially higher than 200° F. for well over a half hour before being switched off by the protective circuit.

Although an embodiment has been described utilizing 10 batteries, a smaller tray would require proportionately fewer batteries and conversely a larger heating surface would require more batteries to provide equivalent time and temperature output.

It should also be understood that the principles embodied in this invention are utilizable not only for a heat-maintaining and warming tray but also for portable heating cabinets wherein the heating surfaces would be enclosed completely. The tray is suitably provided with a portable support therefor (not illustrated) such as a teacart so that it can be rolled around and disposed where needed.

The tray may also be pivotally mounted on a movable support so that it acts as a lazy susan. That is, the entire heat-maintaining and warming tray may be made in a rounded housing with the tray pivotally mounted about a vertical axis.

Without further elaboration, the foregoing will so fully illustrate our invention that others may, by applying current or future knowledge, readily adapt the same for use under various conditions of service.

What is claimed as the invention is:

1. A warming device having a self-contained power source, said device including a heatable plate, said plate having secured thereto in heat exchange relation therewith at least one strip of heating tape, said power source comprising rechargeable batteries, switching means connected to said power source for connecting said heating strip to said power source for heating said plate, said switching means including means for automatically disconnecting said strip from said power source when the output voltage of said batteries falls below a predetermined voltage.

2. The warming device of claim 1 wherein said heatable plate is comprised of a heat-conductible metal.

3. The warming device of claim 1 wherein said rechargeable batteries are comprised of nickel-cadmium batteries which are connected in serial.

4. The warming device of claim 1 wherein said switching means comprises an electric circuit including a relay, a first transistor which is responsive to the output voltage of said batteries and a further pair of transistors which are controlled by the output of said first transistor and which control the current in the coil of said relay, said relay including a plurality of contact elements for connecting said batteries to said circuit and to said heating tape, said contact elements being closed to connect said batteries to said circuit and to said heating tape as long as said relay is energized, and said contact elements being opened to disconnect said batteries from said circuit and said heating tape when said relay is deenergized, for completely open circuiting said batteries when said relay is deenergized, whereby to prevent disruption of the batteries by current drainage during extended periods of disuse.

5. The warming device of claim 1 wherein said heating tape comprises a plurality of resistive strip heaters which are secured to the bottom surface of said heatable plate in heat exchange relation therewith, said strips being provided over substantially the entire surface of said plate.

6. The warming device of claim 1 wherein said heatable plate is encompassed by a peripheral frame which is comprised of a nonheat conductive material to minimize loss of heat from said plate.

7. The warming device of claim 1 in which said plate is horizontally disposed at the top thereof and said heating tape is secured to its lower surface, said warming device further including a housing disposed below said heating plate for containing the power source and all of the electrical circuitry utilized between said power source and said heating tape, said housing further including thermal insulation blocks which are supported immediately below said heating plate to prevent downward dissipation of the heat at said plate into said housing.

8. The warming device of claim 1 and further including a resistive means which is selectively connected serially to said heating tape, said resistive means enabling a longer period of heating when connected serially to said heating tape, said resistive means being secured to the bottom surface of said heatable plate in heat exchange relation therewith to enable the heatable plate to capture the heat of said resistive means.

9. The warming device of claim 8 wherein said resistive means is of elongated shape and is disposed in heat distributive relation with respect to said heatable plate.

10. The warming device of claim 1 characterized in that a manual switch is provided for selectively connecting said batteries to said switching means and to an external direct current source for charging said batteries.

11. The warming device of claim 1 wherein said batteries are assembled in serial as a unit package capable of being selectively electrically connected to the circuitry of said warming device and to be removed therefrom.

* * * * *